(12) United States Patent
Kahler et al.

(10) Patent No.: US 10,133,883 B2
(45) Date of Patent: Nov. 20, 2018

(54) RAPID SAFEGUARDING OF NVS DATA DURING POWER LOSS EVENT

(75) Inventors: David Ray Kahler, Tucson, AZ (US); Anjul Mathur, Tucson, AZ (US); Richard Anthony Ripberger, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 932 days.

(21) Appl. No.: 12/368,032

(22) Filed: Feb. 9, 2009

(65) Prior Publication Data

US 2010/0202236 A1   Aug. 12, 2010

(51) Int. Cl.
*G06F 21/80* (2013.01)
*G06F 11/14* (2006.01)
(Continued)

(52) U.S. Cl.
CPC .......... *G06F 21/80* (2013.01); *G06F 11/1441* (2013.01); *G06F 12/0804* (2013.01);
(Continued)

(58) Field of Classification Search
CPC ...... G06F 11/00; G06F 11/07; G06F 11/0703; G06F 11/0793; G06F 11/0796; G06F 11/14; G06F 11/1402; G06F 11/1415; G06F 11/1441; G06F 11/1446; G06F 11/1458; G06F 11/1471; G06F 11/30; G06F 11/3003; G06F 11/3034; G06F 12/00; G06F 12/08; G06F 12/0802; G06F 12/0804; G06F 12/0866; G06F 12/0868; G06F 12/0873; G06F 12/14; G06F 12/1408; G06F 21/00; G06F 21/70; G06F 21/78; G06F 21/80; G06F 21/81
(Continued)

(56) References Cited

U.S. PATENT DOCUMENTS 4,731,843 A     3/1988   Holmquist
5,179,662 A  *  1/1993   Corrigan et al. ................. 711/2
(Continued)

FOREIGN PATENT DOCUMENTS

CN      101114188 A     1/2008
JP      2002207713 A    7/1994
(Continued)

OTHER PUBLICATIONS

International Search Report for Counterpart Application No. PCT/EP2010/050631, dated May 7, 2010.

*Primary Examiner* — Jung Kim
*Assistant Examiner* — Adrian Stoica
(74) *Attorney, Agent, or Firm* — Griffiths & Seaton PLLC

(57) ABSTRACT

A method, system, and computer program product for safeguarding nonvolatile storage (NVS) data by a processor in communication with a memory device following a power loss event is provided. A first portion of the NVS data is encrypted using a first buffer module. Subsequently the first portion of the NVS data is transferred to at least one shared storage device, while a second portion of the NVS data is simultaneously encrypted using a second buffer module. The second portion of the NVS data is subsequently transferred to the at least one shared storage device.

22 Claims, 3 Drawing Sheets

(51) Int. Cl.
*G06F 12/0804* (2016.01)
*G06F 21/81* (2013.01)
*G06F 12/0866* (2016.01)

(52) U.S. Cl.
CPC .......... *G06F 21/81* (2013.01); *G06F 12/0866* (2013.01); *Y02D 10/13* (2018.01)

(58) Field of Classification Search
USPC .......................................................... 714/24
See application file for complete search history.

(56) References Cited

U.S. PATENT DOCUMENTS

| | | | |
|---|---|---|---|
| 5,329,623 A * | 7/1994 | Smith et al. .................. 713/153 |
| 5,826,029 A * | 10/1998 | Gore et al. .................... 709/227 |
| 6,098,158 A * | 8/2000 | Lay ........................ G06F 9/4401 |
| | | | 711/161 |
| 6,295,577 B1 * | 9/2001 | Anderson ........... G06F 11/1441 |
| | | | 711/111 |
| 6,983,366 B1 | 1/2006 | Huynh et al. |
| 7,158,637 B2 | 1/2007 | Ohta et al. |
| 7,162,643 B1 | 1/2007 | Sankaran et al. |
| 2002/0057799 A1 | 5/2002 | Kohno |
| 2002/0078342 A1 | 6/2002 | Matthews, Jr. |
| 2002/0191793 A1 | 12/2002 | Adand et al. |
| 2005/0193242 A1 | 9/2005 | Ash et al. |
| 2005/0210316 A1 * | 9/2005 | Benhase ............. G06F 11/1456 |
| | | | 714/6.12 |
| 2006/0015683 A1 * | 1/2006 | Ashmore ............... G06F 1/3203 |
| | | | 711/113 |
| 2006/0041938 A1 * | 2/2006 | Ali .................................. 726/14 |
| 2006/0115081 A1 * | 6/2006 | Buer et al. ....................... 380/44 |
| 2006/0212644 A1 * | 9/2006 | Acton et al. .................. 711/103 |
| 2006/0224849 A1 * | 10/2006 | Rezaul Islam ...... G06F 11/1666 |
| | | | 711/170 |
| 2006/0248387 A1 * | 11/2006 | Nicholson ........... G06F 12/0804 |
| | | | 714/22 |
| 2007/0116266 A1 | 5/2007 | Greco et al. |
| 2007/0192547 A1 | 8/2007 | Feghali et al. |
| 2008/0024899 A1 * | 1/2008 | Chu ..................... G06F 3/0614 |
| | | | 360/69 |
| 2008/0189484 A1 * | 8/2008 | Iida et al. ...................... 711/114 |
| 2008/0235519 A1 | 9/2008 | Onouchi et al. |

FOREIGN PATENT DOCUMENTS

| | | |
|---|---|---|
| JP | 2002358008 A | 12/2002 |
| JP | 2008524754 A | 7/2008 |
| WO | 2002/103984 A2 | 12/2002 |
| WO | 2007/095397 A2 | 8/2007 |

* cited by examiner

RAPID SAFEGUARDING OF NVS DATA DURING POWER LOSS EVENT

BACKGROUND OF THE INVENTION

Field of the Invention

The present invention relates in general to computers, and more particularly to a method, system, and computer program product for safeguarding nonvolatile storage (NVS) data by a processor in communication with a memory device.

Description of the Related Art

Storage devices such as disks are commonplace in today's society. Devices such as controllers control access to the storage devices in response to read and write requests. The storage controllers also mirror data to different storage devices and spread data amongst different storage devices for redundancy and backup purposes. Storage controllers may store data in accordance with one of several redundant array of independent disk (RAID) security levels. Generally, the higher the RAID level the greater the redundancy of the data storage. Pooled storage devices may be used to increase storage capacity and provide recovery and backup services.

Storage servers, such as an IBM® Enterprise Storage Server® (ESS), are also becoming commonplace. One IBM® ESS storage server includes two clusters of processors and associated hardware. Typically, there are multiple processors in each cluster. Each of the storage controllers controls multiple storage devices grouped in RAID arrays. In one environment, clients with Fiber Channel Host Bus Adapters ("HBAs") are coupled via a Fiber Channel to a switch. The switch is also coupled to the Storage Server with Fiber Channel HBAs. There may be multiple storage servers per client. Each client is assigned or allocated storage "volumes" which are mapped to physical locations on storage devices that are grouped in RAID arrays. Consequently, clients make data access requests (reads and writes) to the storage server, for data within their allocated volumes, and the storage server accesses the mapped locations in cache storage to satisfy the requests or from disk if the data does not reside in cache storage.

One IBM® ESS comprises a storage controller with two clusters and four processors per cluster. Each cluster has its own cache (semiconductor) memory shared by all processors in the cluster. Each cluster also has battery backed up nonvolatile storage ("NVS") that is shared by all of the processors in the cluster. In addition, each cluster has its own cache storage. The cache memory is used for rapid access to data inpaged from external storage to service read data access requests from memory and to provide buffering of modified data. All write requests are written to the cache on the cluster managing a given volume and are mirrored in the nonvolatile memory on the other cluster.

Storage systems such as ESS send commit messages to connected data hosts following the completion of the transfer of write data to both the cache and NVS, and before the write data is written to disk. After the commit message is received, hosts no longer need keep a copy of this write data. In some systems, in the event of a power loss, NVS does not function to retain data, but rather achieves the non-volatility by destaging the data onto a hard disk with the help of a battery backup component.

SUMMARY OF THE INVENTION

In implementations where NVS does not retain data but facilitates the destaging of the data to disk during a power loss event, it is desirable to write the NVS data as quickly as possible to allow the capacity of the backup battery system to be minimized. Encrypting such data provides additional security against data theft. While solutions exist for writing NVS data to disk (such as a shared storage device) in the event of a power loss event, a solution for providing encryption functionality to such data while completing the data transfer in a rapid manner is nonexistent.

In view of the foregoing, a need exists for a mechanism to write NVS data to disk in a rapid and efficient manner so as to avoid data loss, while at the same time, safeguarding such data. Accordingly, in one embodiment, by way of example only, a method for safeguarding nonvolatile storage (NVS) data by a processor in communication with a memory device following a power loss event is provided. A first portion of the NVS data is encrypted to a first buffer module. Subsequent to encrypting data into the first data buffer, the first data buffer is transferred to a shared storage device while simultaneously, a second portion of the NVS data is encrypted to a second buffer module. This process then repeats, alternating between the first and second buffer modules until all NVS data is encrypted to one or the other buffer module and transferred to disk. After the first portion of NVS data is encrypted to the first buffer module, the encrypting operation for one buffer overlaps the transfer to the shared disk by the other buffer.

In another embodiment, again by way of example only, a system for safeguarding nonvolatile storage (NVS) data by a processor in communication with a memory device following a power loss event is provided. First and second buffer modules are provided. A first portion of the NVS data is encrypted to the first buffer module. Subsequent to encrypting data into the first data buffer, the first data buffer is transferred to a shared storage device while simultaneously, a second portion of the NVS data is encrypted to the second buffer module. This process then repeats, alternating between the first and second buffer modules until all NVS data is encrypted to one or the other buffer module and transferred to disk. After the first portion of NVS data is encrypted to the first buffer module, the encrypting operation for one buffer overlaps the transfer to the shared disk by the other buffer.

In still an additional embodiment, again by way of example only, a computer program product for safeguarding nonvolatile storage (NVS) data by a processor in communication with a memory device is provided. The computer program product comprises a computer-readable storage medium having computer-readable program code portions stored therein. The computer-readable program code portions comprise several executable portions for performing the following. A first portion of the NVS data is encrypted to a first buffer module. Subsequent to encrypting data into the first data buffer, the first data buffer is transferred to a shared storage device while simultaneously, a second portion of the NVS data is encrypted to a second buffer module. This process then repeats, alternating between the first second buffer modules until all NVS data is encrypted to one or the other buffer module and transferred to disk. After the first portion of NVS data is encrypted to the first buffer module, the encrypting operation for one buffer overlaps the transfer to the shared disk by the other buffer.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide mechanisms for safeguarding NVS data, including encrypting the data to provide additional security and writing the data to shared storage, pursuant to a power loss event. Throughout the following description and appended claims, reference to "power loss event" may refer to a number of scenarios, as the skilled artisan will appreciate, including power fluctuations. Accordingly, a power loss event as used herein may refer to any situation where it is desirable that NVS data be written to a shared storage device. In addition, NVS data as used herein may refer to any customer data that is not hardened to disk.

As will be seen, the illustrated embodiments safeguard NVS data pursuant to a power loss event by simultaneously writing and encrypting portions of the NVS data to a storage device in parallel. That is, while one portion of the NVS data is being encrypted, an additional portion, previously encrypted, is written to the storage device. As a result, in approximately the same time it would normally take to write the NVS data to storage, the NVS data is also encrypted for additional safety.

In one embodiment, two buffer modules are configured in parallel to encrypt and write data in NVS to a shared storage device. The two buffers (referred to here in as buffer A and buffer B) are used alternatively to encrypt and write data. While buffer A is encrypting data, buffer B is busy writing encrypted data to storage device. When buffer B is done writing to storage device, then buffer A starts writing the encrypted data that it is holding and buffer B starts to encrypt the next block of NVS data.

At any one time, one buffer is encrypting data, and the other buffer is writing to disk. Accordingly, buffer A and buffer B operate in parallel, encrypting and writing data to the storage device. By working in parallel, NVS data not only gets written to the device but it also gets encrypted in the same amount of time. Using buffers to do the work in parallel enables the writing encrypted data to the storage device during a power loss event, such as a loss of power to one or more storage controllers.

The illustrated embodiments are applicable to all implementations processing customer data that is not hardened to a customer disk. Any data that is saved via fire hose dump (FHD) or a similar methodology may be processed using one or more aspects of the illustrated embodiments of the present invention.

Figure 1:
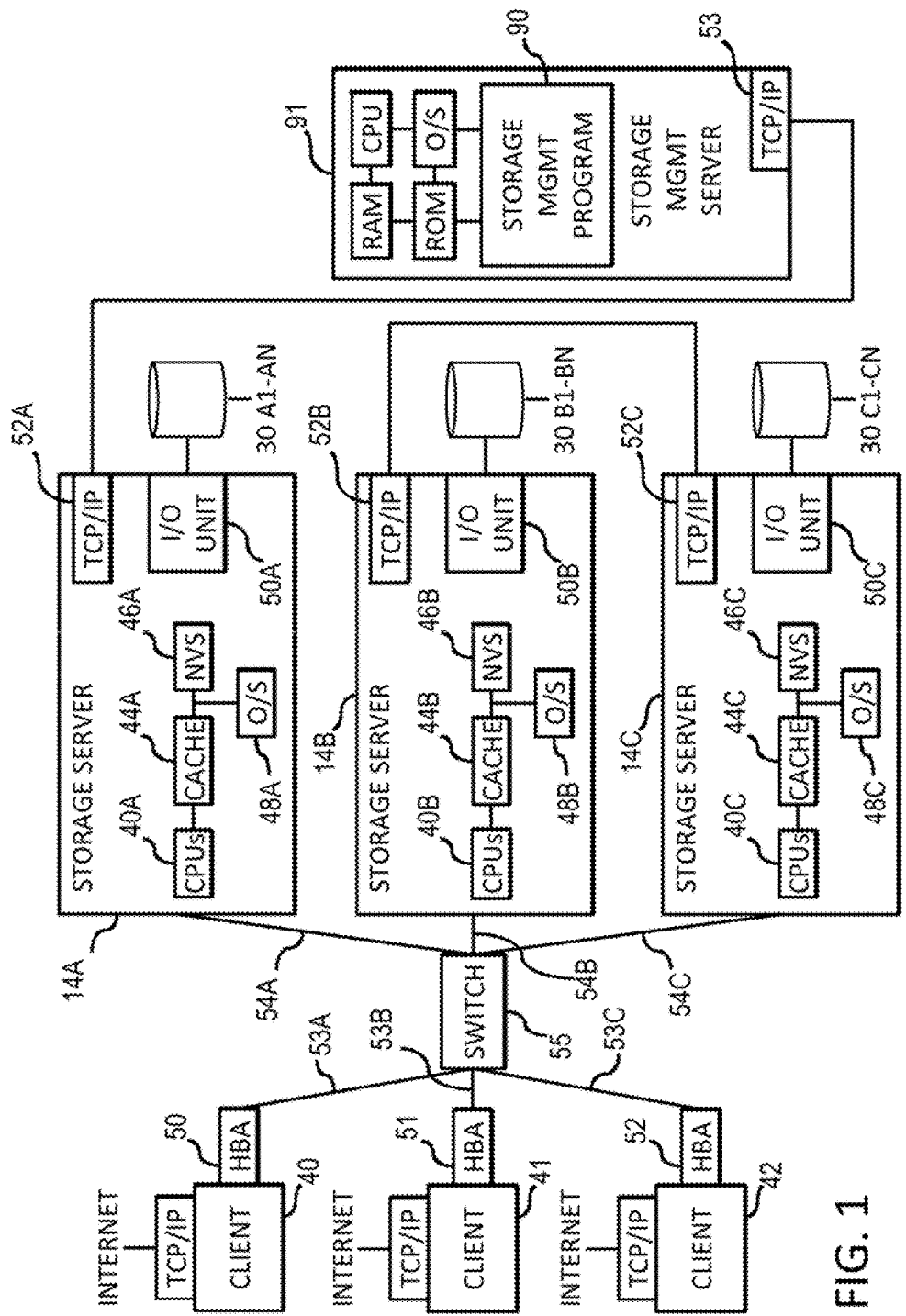
FIG. 1 is a block diagram of a distributed computer system including storage servers and a storage management server, in which aspects of the following description and claimed subject matter may be implemented.

FIG. 1 hereafter provides one example of a portion of a mirrored data storage system architecture in which the mechanisms of the illustrative embodiments may be implemented. It should be appreciated, however, that FIG. 1 is only exemplary and is not intended to state or imply any limitation as to the particular architectures in which the exemplary aspects of the illustrative embodiments may be implemented. Many modifications to the architecture depicted in FIG. 1 may be made without departing from the scope and spirit of the following description and claimed subject matter.

FIG. 1 illustrates an exemplary distributed computer system generally designated 10 which includes the present invention. System 10 comprises multiple, similar storage servers/controllers 14 a,b,c with multiple CPUs 40 a,b,c per cluster (See FIG. 2, following, for CPU organization in each cluster), cache 44 a,b,c, nonvolatile storage ("NVS") 46 a,b,c, operating system 48 a,b,c, I/O unit 50 a,b,c, and TCP/IP adapter card 52a,b,c. Each of the storage servers 14 a,b,c manages storage allocation and access to multiple storage devices (such as disks) 30a1-an, 30b1-bn, and 30c1-cn, respectively, by clients 40, 41 and 42.

Clients 40, 41 and 42 have adapter cards 50, 51 and 52, such as a Fibre Channel adapter cards, for connection via a communication path 53 a,b,c, such as a Fibre Channel, to a switch 55. Switch 55 can be coupled to storage servers 14 a,b,c via host busses 54 a,b,c, and can forward a request from any of the clients 40, 41 or 42 to any of the storage servers 14, a,b,c as configured on the client. An administrator has allocated to each of the clients 40, 41 and 42 a number of storage "volumes". Each "volume" resides on a storage array. A "storage array" can comprise one or more storage devices and be configured in a variety of RAID levels such as RAID 5, RAID 10 or Just a Bunch of Disks (commonly referred to as JBOD).

Figure 2:
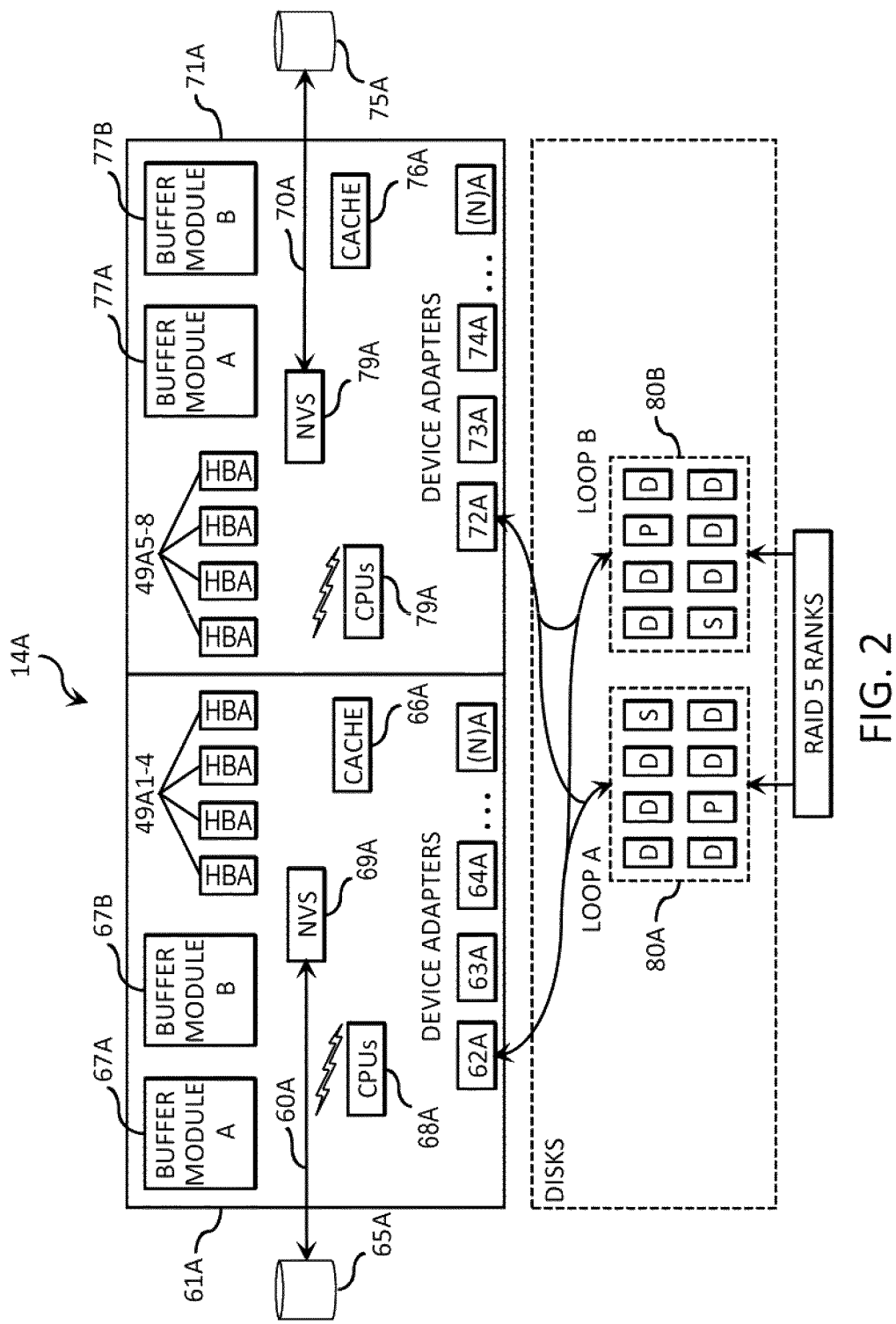
FIG. 2 is a block diagram of one of the storage servers of FIG. 1.

In the exemplary embodiment illustrated in FIG. 2, storage controller 14a (and likewise storage controller 14b and c) includes two identical clusters 61a and 71a of CPUs 68a and 78a, cache 66a and 76a, NVS 69a and 79a, and any number of pairs of device adapters (62a-(N)a and 72a-(N)a per cluster). There is a shared cache (semiconductor) memory 66a and 76a for each cluster 61a and 71a, respectively. Each cluster also contains battery backed-up storage 69b and 79a (also called "NVS"). In FIG. 2, "D" represents a data disk, "P" represents a parity disk for storing parity bits for the data in the data disks, and "S" represents a spare disk in the event of failure of a data disk or parity disk. Each cluster maintains a mapping of the storage allocation to each client that correlates each storage volume to corresponding physical locations on the storage arrays.

One or more disks as shown in FIG. 2 may be adapted to be a fire hose dump (FHD) disk 65a and 75a, utilized for the purpose of storing data pursuant to a fire hose dump operation. Typically, FHD data is stored on boot disks, such as an AIX® operating system boot disk. These boot disks are non-encrypting/unencrypted in nature. Since it is inherently undesirable to write cache data on a non-encrypting storage device, the illustrated embodiments of the present invention serve as a way to safeguard the cache data (using encryption as will be further described) in the shortest time possible. Hence, FHD data at rest (on such devices as the aforementioned boot disk) is secure.

NVS 69a and 79a are interconnected with disks 65a and 75a via communication links 60a and 70a, respectively. In certain embodiments, communication links 60a and 70a are selected from a serial interconnection, such as RS-232 or RS-422, an Ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In certain embodiments, disks 65a and 75a comprise one or more optical storage media, one or more magnetic storage media, one or more electronic storage media, and combinations thereof. In certain embodiments, disks 65a and 75a are external to clusters 61a and 71a. In certain embodiments, disks 65a and 75a are internal to clusters 61a and 71a.

When the client requests access to storage, i.e. to read from or write to data in one of the volumes allocated to the client, then the storage cluster that manages that volume will process the request, i.e. temporarily store client updates into the cache memory and NVS on the paired cluster. For update requests, an I/O completion notification is sent to the client upon NVS store. Upon reaching an internal threshold for pending writes, the cluster will map the client request to the physical locations, and then forward the mapped request from the cache storage to the appropriate storage array. For read requests, data is either satisfied from cache memory or requires disk access (because of a "cache miss"). Cache misses for read requests require the cluster to map the client request to the physical locations on the storage array and transfer the data from the physical location on the arrays to the cache memory where it satisfies the client I/O request.

Referring again to FIG. 1, system 10 also includes a storage management program (SMP) module 90 in a storage management server 91, according to the present invention to detect failover occurrences, implement the aforementioned preserved memory cache, and process the retained tracks. In the illustrated embodiment, computer 91 is coupled to storage servers 14 *a,b,c* via a SAN network. Alternately, there can be a separate instance of module 90 executing on each storage server/controller 14 *a,b,c* and communicating with the other instances of program 90 on the other storage servers via a TCP/IP network. The skilled artisan will appreciate that a variety of implementations of SMP module in communication with the overall storage subsystem are contemplated.

Referring again to FIG. 2, server 14a is shown including four buffer modules 67a,b and 77a,b, two for each cluster. Buffer modules 67a,b and 77a,b may be adapted to perform functionality according to the present invention, as will be further described, following. While buffer modules 67a,b and 77a,b are shown incorporated into clusters 61a and 71a, the skilled artisan will appreciate that the buffer modules 67a,b and 77a,b may be physically located elsewhere, yet remain in communication with the depicted storage controllers, cache memory, NVS, etc. Buffer modules 67a,b and 77a,b may be adapted for encrypting and storing portions of NVS data to disk pursuant to a power loss event, for example. This and further functionality will be further described, below.

Figure 3:
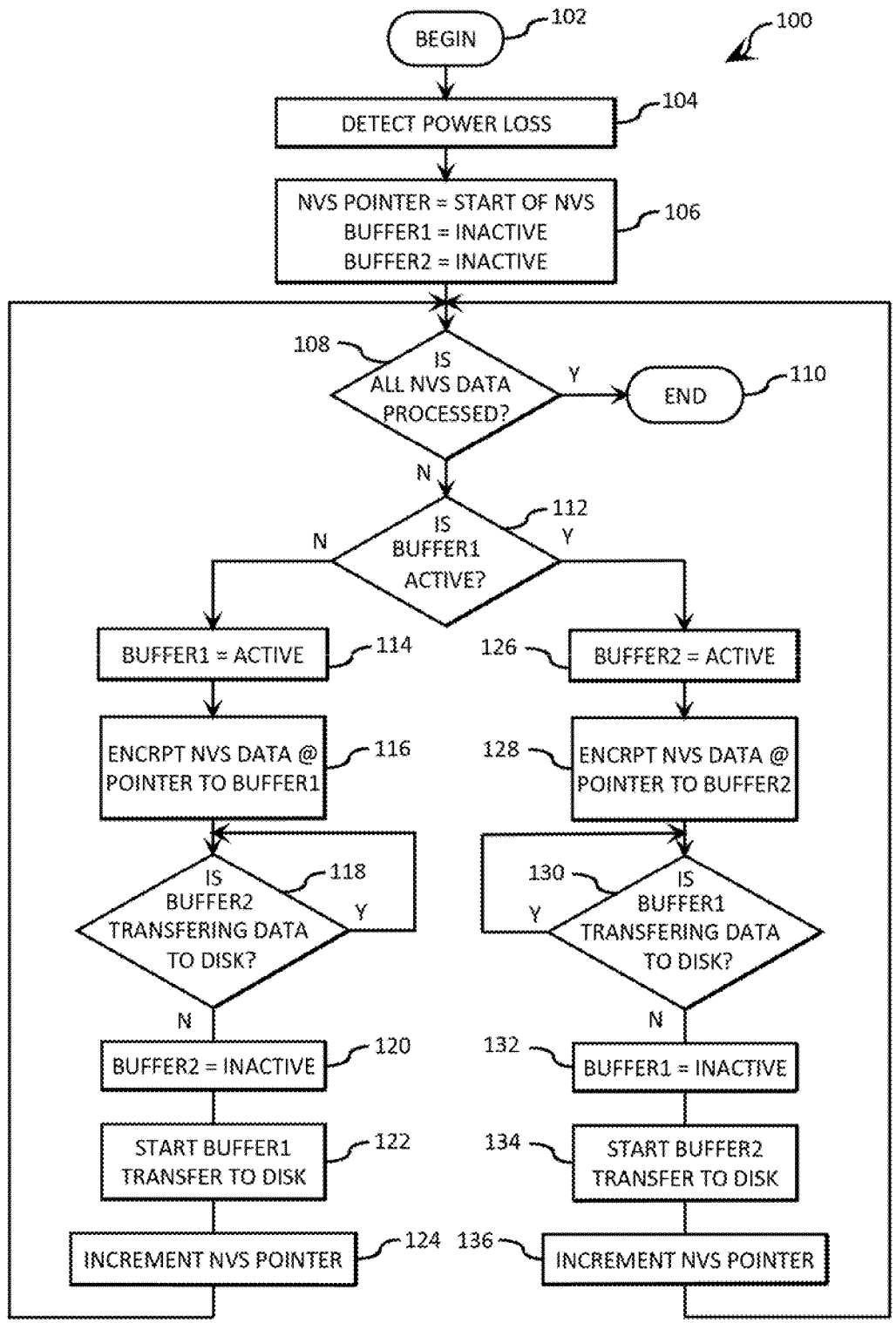
FIG. 3 is a flow chart of an exemplary method for safeguarding NVS data pursuant to a power loss event.

FIG. 3, following, illustrates an exemplary method 100 for safeguarding NVS data to shared storage pursuant to a power loss event. As one skilled in the art will appreciate, various steps in the method 100 may be implemented in differing ways to suit a particular application. In addition, the described methods may be implemented by various means, such as hardware, software, firmware, or a combination thereof operational on or otherwise associated with the storage environment. For example, the methods may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

As the skilled artisan will appreciate, flow through the method 100 typically proceeds through several iterations, as portions of data are read, encrypted, and written to a shared storage device. The processes described in the illustrated embodiment may together comprise all, or a portion, of a fire hose dump (FHD) operation, where NVS data is moved through the FHD operation to a FHD disk.

Turning now to FIG. 3, method 100 begins (step 102) with the detection of a power loss event (step 104). For example, the power loss event may be a temporary or permanent loss of power to one or more storage controllers. Control moves to step 106, which describes a beginning scenario where the NVS address pointer points to the start of NVS memory, and the contents of both buffer modules (designated "1" and "2" herein) are empty and inactive.

Since no NVS data has been yet processed (step 108), the method 100 queries if the first buffer is active (step 112). If no, buffer 1 is made active (step 114). A portion of NVS data is read beginning with an address pointed to by the NVS address pointer, which in this case is an address coinciding with the start of memory as described in step 106. The portion of data may be organized in terms of one or more blocks of data. As the skilled artisan will appreciate, the portion may vary depending on a particular implementation (e.g., size of the buffer).

The NVS data read into the buffer 1 is encrypted (step 116). As a next step, the method 100 queries if buffer 2 is in the process of transferring to disk (step 118). If so, the method 100 returns to step 118 (waits) until that process is complete, and buffer 2 becomes inactive (step 120). At this point, the encrypted contents of buffer 1 are transferred to disk and the buffer 1 is cleared (step 122), and the NVS pointer is incremented to the beginning of the next portion of data not yet read (step 124). The method 100 then returns to step 108.

If NVS data remains to be processed (again, step 108), the method 100 again queries if the buffer 1 is active (again, step 112). If so, the buffer 2 is made active (step 126), and NVS data is read into the buffer 2 and encrypted (step 128) as in step 116. The method 100 then queries if the buffer 1 is currently in the process of transferring data to disk (step 130). If so, the method 100 returns to step 130 (waits) until that process is complete, and buffer 1 becomes inactive (step 132). At this point, the encrypted contents of buffer 2 are transferred to disk and the buffer 2 is cleared (step 134), and the NVS pointer is incremented to the beginning of the next portion of data not yet read (step 136).

The method 100 then returns to step 108. Again, the method 100 queries if all NVS data is processed. If NVS data is all processed, then the method 100 ends (step 110).

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for safeguarding nonvolatile storage (NVS) data by a processor in communication with a memory device following a power loss event, comprising:
in a storage system in which a storage controller therein uses an NVS device, the NVS device separate from a cache and remaining nonvolatile upon losing power, to facilitate destaging of the NVS data from the cache to at least one shared storage device in lieu of retaining the NVS data within the NVS device following the power loss event, encrypting a first portion of the NVS data using a first buffer module of a predetermined size; and
subsequently transferring the first portion of the NVS data to the at least one shared storage device while simultaneously encrypting a second portion of the NVS data using a second buffer module of a predetermined size, and subsequently transferring the second portion of the NVS data to the at least one shared storage device;
wherein upon detecting the power loss event, an NVS address pointer points to a start of the NVS device comprising a beginning block of the first portion of the NVS data, the first portion of the NVS data encrypted by the first buffer module upon the first buffer module becoming active; wherein subsequent to the first buffer encrypting and transferring the first portion of the NVS data to the at least one shared storage device, the NVS address pointer is incremented to point to a next beginning block of the second portion of the NVS data comprising consecutive data following the first portion of the NVS data not yet read, the second portion of the NVS data starting at the next beginning block being encrypted and transferred to the at least one shared storage device by the second buffer module; and wherein the encrypting the first portion of the NVS data using the first buffer module, and the transferring the first portion of the NVS data to the at least one shared storage device together comprise a portion of a fire hose dump (FHD) operation, wherein the FHD operation includes moving the NVS data to a FHD disk, the FHD disk comprising an Advanced Interactive eXecutive (AIX) operating system boot disk storing the encrypted portions of the NVS data.

2. The method of claim 1, wherein the transferring the first portion of the NVS data and the encrypting the second portion of the NVS data overlaps.

3. The method of claim 2, further including encrypting a third portion of the NVS data using the first buffer module, wherein the transferring of the second portion of the NVS data and the encrypting the third portion of the NVS data overlaps.

4. The method of claim 3, wherein the transferring of the first portion of the NVS data and the transferring of the second portion of the NVS data do not overlap.

5. The method of claim 4, further including performing additional encrypting of additional portions of NVS data and additional transferring of additional portions of NVS data until all portions of the NVS data are processed.

6. The method of claim 1, further including, subsequent to the transferring the first portion of the NVS data to the at least one shared storage device, clearing the first buffer module.

7. The method of claim 6, further including, subsequent to the clearing the first buffer module, incrementing an NVS address pointer.

8. The method of claim 1, further including, previous to the encrypting the first portion of the NVS data using the first buffer module, detecting the power loss event.

9. A system for safeguarding nonvolatile storage (NVS) data by a processor in communication with a memory device following a power loss event, comprising:
a storage server including a storage controller therein, wherein the storage controller uses an NVS device, the NVS device separate from a cache and remaining nonvolatile upon losing power, to facilitate destaging of the NVS data from the cache to at least one shared storage device in lieu of retaining the NVS data within the NVS device following the power loss event, and
first and second buffer modules comprised within the storage server, each of a predetermined size, operable in parallel by the processor and in communication with the memory device, wherein:
the first buffer module encrypts a first portion of the NVS data and subsequently transfers the first portion of the NVS data to the at least one shared storage device, and
the second buffer module, simultaneous with the transferring the first portion of the NVS data to the at least one shared storage device, encrypts a second portion of the NVS data, and further subsequently transfers the second portion of the NVS data to the at least one shared storage device;
wherein upon detecting the power loss event, an NVS address pointer points to a start of the NVS device comprising a beginning block of the first portion of the NVS data, the first portion of the NVS data encrypted by the first buffer module upon the first buffer module becoming active; wherein subsequent to the first buffer encrypting and transferring the first portion of the NVS data to the at least one shared storage device, the NVS address pointer is incremented to point to a next beginning block of the second portion of the NVS data comprising consecutive data following the first portion of the NVS data not yet read, the second portion of the NVS data starting at the next beginning block being encrypted and transferred to the at least one shared storage device by the second buffer module; and wherein the encrypting the first portion of the NVS data using the first buffer module, and the transferring the first portion of the NVS data to the at least one shared storage device together comprise a portion of a fire hose dump (FHD) operation, wherein the FHD operation includes moving the NVS data to a FHD disk, the FHD disk comprising an Advanced Interactive eXecutive (AIX) operating system boot disk storing the encrypted portions of the NVS data.

10. The system of claim 9, wherein the transferring the first portion of the NVS data and the encrypting the second portion of the NVS data overlaps.

11. The system of claim 10, wherein the first buffer module encrypts a third portion of the NVS data, wherein the transferring of the second portion of the NVS data and the encrypting the third portion of the NVS data overlaps.

12. The system of claim 11, wherein the transferring of the first portion of the NVS data and the transferring of the second portion of the NVS data do not overlap.

13. The system of claim 12, wherein the first and second buffer modules perform additional encrypting of additional portions of NVS data and additional transferring of additional portions of NVS data until all portions of the NVS data are processed.

14. The system of claim 9, wherein the first buffer module, subsequent to the transferring the first portion of the NVS data to the at least one shared storage device, clears the first buffer module.

15. The system of claim 14, wherein the first buffer module, subsequent to the clearing the first buffer module, increments an NVS address pointer.

16. A computer program product for safeguarding nonvolatile storage (NVS) data by a processor in communication with a memory device following a power loss event, the computer program product comprising a non-transitory computer-readable storage medium having computer-readable program code portions stored therein, the computer-readable program code portions comprising:

a first executable portion that, in a storage system in which a storage controller therein uses an NVS device, the NVS device separate from a cache and remaining nonvolatile upon losing power, to facilitate destaging of the NVS data from the cache to at least one shared storage device in lieu of retaining the NVS data within the NVS device following the power loss event, encrypts a first portion of the NVS data using a first buffer module of a predetermined size; and a second executable portion that subsequently transfers the first portion of the NVS data to the at least one shared storage device while simultaneously encrypting a second portion of the NVS data using a second buffer module of a predetermined size, and subsequently transfers the second portion of the NVS data to the at least one shared storage device, wherein the transferring the first portion of the NVS data and the encrypting the second portion of the NVS data overlaps;

wherein upon detecting the power loss event, an NVS address pointer points to a start of the NVS device comprising a beginning block of the first portion of the NVS data, the first portion of the NVS data encrypted by the first buffer module upon the first buffer module becoming active; wherein subsequent to the first buffer encrypting and transferring the first portion of the NVS data to the at least one shared storage device, the NVS address pointer is incremented to point to a next beginning block of the second portion of the NVS data comprising consecutive data following the first portion of the NVS data not yet read, the second portion of the NVS data starting at the next beginning block being encrypted and transferred to the at least one shared storage device by the second buffer module; and wherein the first executable portion performing the encrypting the first portion of the NVS data using the first buffer module, and the second executable portion performing the transferring the first portion of the NVS data to the at least one shared storage device together comprise a portion of a fire hose dump (FHD) operation, wherein the FHD operation includes moving the NVS data to a FHD disk, the FHD disk comprising an Advanced Interactive eXecutive (AIX) operating system boot disk storing the encrypted portions of the NVS data.

17. The computer program product of claim 16, further including a third executable portion that encrypts a third portion of the NVS data using the first buffer module, wherein the transferring of the second portion of the NVS data and the encrypting the third portion of the NVS data overlaps.

18. The computer program product of claim 16, wherein the transferring of the first portion of the NVS data and the transferring of the second portion of the NVS data do not overlap.

19. The computer program product of claim 17, further including a fourth executable portion that performs additional encrypting of additional portions of NVS data and additional transferring of additional portions of NVS data until all portions of the NVS data are processed.

20. The computer program product of claim 16, further including a third executable portion that, subsequent to the transferring the first portion of the NVS data to the at least one shared storage device, clears the first buffer module.

21. The computer program product of claim 20, further including a fourth executable portion that, subsequent to the clearing the first buffer module, increments an NVS address pointer.

22. The computer program product of claim 16, further including a third executable portion that, previous to the encrypting the first portion of the NVS data using the first buffer module, detects the power loss event.

* * * * *